(12) United States Patent
Kim et al.

(10) Patent No.: US 7,499,376 B2
(45) Date of Patent: Mar. 3, 2009

(54) SYSTEM AND METHOD FOR POSITION AWARENESS FOR MINIMIZING POWER CONSUMPTION IN SENSOR NETWORK ENVIRONMENT

(75) Inventors: Jin Won Kim, Daejeon (KR); Seung Min Park, Daejeon (KR); Il Gon Park, Seoul (KR); Kwang Yong Lee, Daejeon (KR); Doo Seop Eom, Daejeon (KR); Won Hee Lee, Seoul (KR); Woo Young Lee, Seoul (KR); Tae Young Kim, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 101 days.

(21) Appl. No.: 11/633,456

(22) Filed: Dec. 5, 2006

(65) Prior Publication Data
US 2007/0133352 A1    Jun. 14, 2007

(30) Foreign Application Priority Data
Dec. 8, 2005    (KR) .................... 10-2005-0119466
May 25, 2006    (KR) .................... 10-2006-0046987

(51) Int. Cl.
*G01S 3/80* (2006.01)
(52) U.S. Cl. ..................................... 367/128
(58) Field of Classification Search ........... 342/44, 342/118, 126, 165, 186, 385, 450, 453, 357.14; 367/6, 117, 128, 129, 907
See application file for complete search history.

(56) References Cited

U.S. PATENT DOCUMENTS

2007/0133352 A1*   6/2007   Kim et al. ................... 367/128
2007/0244610 A1*  10/2007   Ozick et al. ................ 701/23

FOREIGN PATENT DOCUMENTS

| KR | 1020040052610 | 6/2004 |
|----|---------------|--------|
| KR | 1020050049274 | 5/2005 |
| KR | 1020050080563 | 8/2005 |
| KR | 1020050083319 | 8/2005 |
| KR | 1020060042579 | 5/2006 |

(Continued)

OTHER PUBLICATIONS

Priyantha, et al., "The Cricket Location-Support System," 6th ACM International Conference on Mobile Computing and Networking (ACM MOBICOM), Boston, MA, Aug. 2000.*
Piontek, et al., "Improving the Accuracy of Ultrasound-Based Localisation Systems," LoCA 2005, LNCS 3479, pp. 132-143, 2005.*

(Continued)

*Primary Examiner*—Dan Pihulic
(74) *Attorney, Agent, or Firm*—Lowe Hauptman Ham & Berner, LLP

(57) ABSTRACT

Provided are a system and method for position awareness that can be used indoors in a large-scale environment and can minimize generation of radio frequency (RF) and ultrasonic waves in a wireless sensor network including low-priced sensor nodes capable of precise position measurement, thus improving energy efficiency by reducing unnecessary power consumption. The method includes the steps of: (a) calculating initial position coordinates using beacon information received from adjacent beacons through a broadcast beacon solicitation signal, sending a synchronization signal to the beacons, and synchronizing the beacons; (b) receiving ultrasonic waves generated from the adjacent beacons activated by a broadcast start message, and calculating position coordinates; and (c) when the calculated position coordinates correspond to a predetermined hand-off threshold position, transmitting a hand-off process message to a newly activated beacon, and executing a hand-off process routine.

17 Claims, 2 Drawing Sheets

FOREIGN PATENT DOCUMENTS

| WO | WO 01/49004 | 7/2001 |
| WO | WO 2004/062198 | 7/2004 |
| WO | WO 2004/095848 | 11/2004 |
| WO | WO 2005/076545 | 8/2005 |
| WO | WO 2005/107164 | 11/2005 |

OTHER PUBLICATIONS

Ward, "Sensor-driven Computing," Dissertation, 1998.*
Notice of Allowance for Korean App. 10-2006-0046987.

* cited by examiner

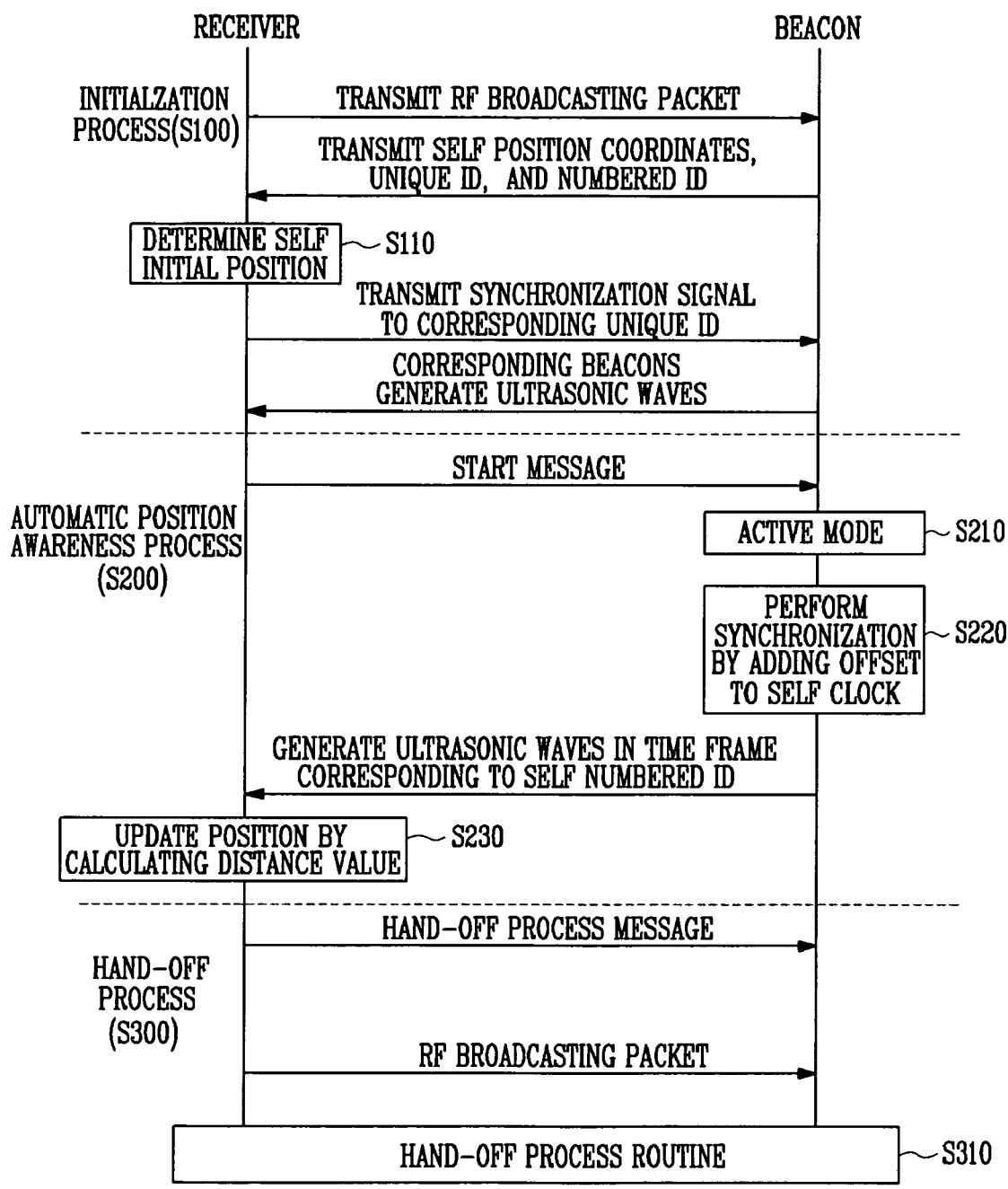

SYSTEM AND METHOD FOR POSITION AWARENESS FOR MINIMIZING POWER CONSUMPTION IN SENSOR NETWORK ENVIRONMENT

CROSS-REFERENCE TO RELATED APPLICATION

This application claims priority to and the benefit of Korean Patent Application Nos. 2005-119466, filed Dec. 8, 2005, and 2006-46987, filed May 25, 2006, the disclosures of which are incorporated herein by reference in their entirety.

BACKGROUND

1. Field of the Invention

The present invention relates to ubiquitous computing, and more particularly, to a system and method for position awareness for minimizing power consumption in a sensor network environment.

2. Discussion of Related Art

Recently, research into ubiquitous computing has come into the spotlight. Ubiquitous computing provides an intelligent environment that can recognize a state of surrounding space and provides a right user or user device with required information at a proper time on the basis of the recognized state.

This is enabled by configuring a network of intelligent micro-computers equipped with a communication device and embedded in surrounding objects and an environment. Thus, even when users are a long distance from each other, variation of the objects and environment is recognized or traced according to a desired location or time, and thus a specialized information service aware of context can be provided.

For an intelligent object or environment to provide a proper service according to a user's situation as mentioned above, a location, condition, and degree of change in location and condition of the user or user device also should be recognized. Therefore, a user's location information will be very important for a context awareness service to be provided in a ubiquitous computing environment.

A typical system capable of obtaining location information of a user is a location measurement system using Global Positioning System (GPS) and a mobile communication network. GPS has the advantages of being usable everywhere on earth and being able to measure a location more precisely than a location measurement system using a mobile communication network. Consequently, GPS is widely used.

However, because GPS requires a line of sight (LoS), it is difficult to apply indoors and it cannot precisely measure location to within several tens of centimeters. In addition, in a ubiquitous computing environment in which computers are embedded in the surroundings and in objects, the price of a device is a very important factor. Thus, GPS may not be appropriate for the environment due to its high price. Meanwhile, in an area of limited size, such as an indoor area, relative location information indicating a distance of an object from a reference location is more useful than absolute location information expressed by latitude, longitude, and so on.

Due to the reasons described above, there is need of a new location measurement system that can be substituted for GPS, which is widely used outdoors. Thus, many inventors are focusing their efforts on providing a low-priced location measurement system that is installed in a user device, a sensor node, etc., and is capable of recognizing a relative location.

SUMMARY OF THE INVENTION

The present invention is directed to a low-priced system and method for position awareness that can be used indoors and can precisely measure a position.

The present invention is also directed to a system and method for position awareness that minimize periodic generation of radio frequency (RF) and ultrasonic waves in a wireless sensor network to reduce unnecessary power consumption and thereby improve energy efficiency.

One aspect of the present invention provides a method for position awareness to minimize power consumption in a sensor network environment, the method comprising the steps of: (a) calculating initial position coordinates using beacon information received from adjacent beacons through a broadcast beacon solicitation signal, sending a synchronization signal to the beacons, and synchronizing the beacons; (b) receiving ultrasonic waves generated from the adjacent beacons activated by a broadcast start message, and calculating position coordinates; and (c) when the calculated position coordinates correspond to a predetermined hand-off threshold position, transmitting a hand-off process message to a newly activated beacon, and executing a hand-off process routine.

Step (a) may include: step (a1) of broadcasting a beacon solicitation signal, which is an RF signal, and transmitting the signal to the beacons fixed at adjacent positions; step (a2) of receiving beacon information of the beacons receiving the beacon solicitation signal, and calculating the initial area position coordinates of a receiver; and step (a3) of sending the synchronization signal to the beacons and synchronizing the beacons, and receiving ultrasonic waves emitted from the beacons in response to confirmation of reception.

Step (b) may include: step (b1) of activating the adjacent beacons by periodically broadcasting the start message, which is an ultrasonic signal; step (b2) of receiving ultrasonic waves generated in time frames assigned in order of numbered identifications (IDs) of beacons after the activated beacons is synchronized by time compensation; and step (b3) of obtaining distance information using arrival time information between the receiver and a beacon obtained by using the received ultrasonic waves, and then, transmitting the distance information to a user device and a context awareness server, calculating the position coordinates, and updating a position.

Step (b1) may further include the step of switching a beacon not receiving the start message for a predetermined time period to a low-power mode.

The position coordinates calculation of step (b3) may include the steps of: when there is data from the receiver while watching a serial interface, reading and parsing the data into three distance values; and obtaining the position coordinates by inputting each parsed distance value into a position coordinates calculation algorithm, and displaying the position coordinates on a graphic user interface (GUI).

Step (c) may include: step (c1) of setting the threshold position for setting a hand-off area considering the ultrasonic range of each beacon; step (c2) of, when the calculated position coordinates correspond to the set hand-off threshold position, transmitting a hand-off process message to the newly activated beacon; and step (c3) of broadcasting a beacon solicitation signal to the beacon using an RF, and executing the hand-off process routine.

The hand-off process message may include information instructing not to transmit ultrasonic waves but to stand by in a time frame in which the beacon transmits the ultrasonic waves.

The threshold position for setting a hand-off area may be set taking as a reference an ultrasonic area of a beacon having the same numbered ID as a beacon transmitting received ultrasonic waves but having a different unique ID.

Step (c) may further include step (c4) of responding, at the beacon receiving the beacon solicitation signal, to the beacon solicitation signal, and periodically performing synchronization with a system.

When the initialization step is finished, the beacons may be kept in a standby state.

The start message may include synchronization information, information on time frames $T_{slot}^n$ according to the order of the numbered ID of each beacon, or activation information.

The activation information may include a unique ID of each beacon.

Another aspect of the present invention provides a system for position awareness to minimize power consumption in a sensor network environment, the system comprising: a plurality of beacons installed at fixed positions at predetermined intervals, and transmitting RF signals and ultrasonic waves; and a receiver capable of position movement, receiving the RF signals and ultrasonic waves transmitted from the beacons, and generating position measurement information on a moved position using a difference in time taken to receive the signals, reception time information, and the RF signals.

The system for position awareness may further comprise: a user device providing the function of position coordinate calculation and the function of a GUI displaying calculated position coordinates using the information generated from the receiver; and a context awareness server recognizing a user's position, connecting to the receiver through a serial interface, and providing a ubiquitous service to the outside through a terminal.

The beacons may be implemented by sensor nodes each having information on two or more addresses such as a unique ID and numbered ID.

The unique ID may be changed according to the number of beacons included in the system, and the numbered ID may be assigned using a number from 0 to 3, in sequence, regardless of the number of beacons included in the system.

The predetermined interval between adjacent beacons may be less than 5 m.

BRIEF DESCRIPTION OF THE DRAWINGS

The above and other features and advantages of the present invention will become more apparent to those of ordinary skill in the art by describing in detail preferred exemplary embodiments thereof with reference to the attached drawings in which:

FIG. 2 is a flowchart illustrating a method for position awareness in a sensor network environment according to an exemplary embodiment of the present invention.

DETAILED DESCRIPTION OF EXEMPLARY EMBODIMENTS

Figure 1:
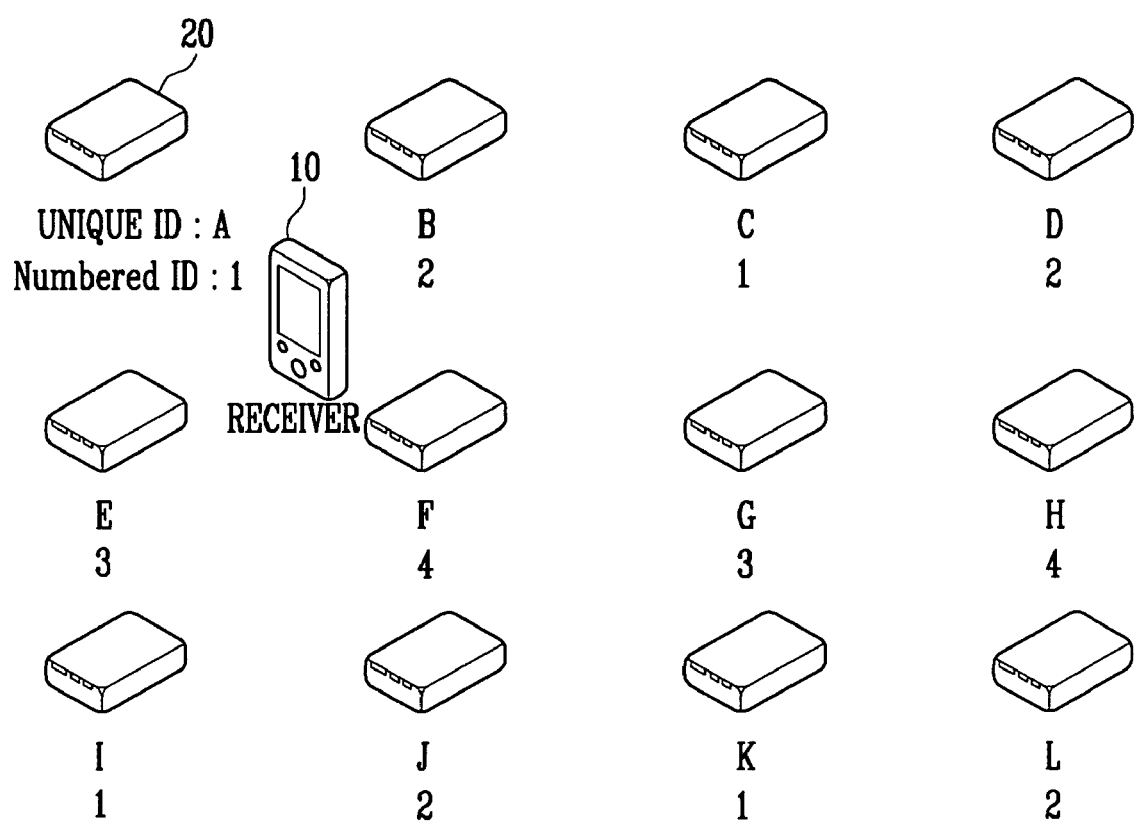
FIG. 1 illustrates the structure of a system for position awareness in a sensor network environment according to an exemplary embodiment of the present invention.

Hereinafter, exemplary embodiments of the present invention will be described in detail. However, the present invention is not limited to the exemplary embodiments disclosed below and can be implemented in various forms. Therefore, the present exemplary embodiments are provided for complete disclosure of the present invention and to fully inform the scope of the present invention to those of ordinary skill in the art.

FIG. 1 illustrates the structure of a system for position awareness in a sensor network environment according to an exemplary embodiment of the present invention.

Referring to FIG. 1, the system comprises a plurality of beacons 20 and a receiver 10. The beacons 20 are installed at fixed positions at predetermined intervals and transmit radio frequency (RF) signals and ultrasonic signals. And, the receiver 10 is capable of position movement, receives the RF signals and ultrasonic signals transmitted from the beacons 20, and generates position measurement information on a moved position using a difference in time taken to receive the signals, reception time information, and the RF signals.

In addition, the system further comprises a user device and a context awareness server. The user device provides the function of position coordinate calculation using the information generated from the receiver 10 and the function of a graphic user interface (GUI) displaying calculated position coordinates, and the context awareness server recognizes a user's position, connects to the receiver through a serial interface, and provides a ubiquitous service to the outside through a terminal.

The beacons 20 are implemented by sensor nodes each having information on two or more addresses such as a unique identification (ID) and numbered ID. Preferably, the unique ID is changed according to the number of beacons 20 included in the system, but the numbered ID is assigned using a number from 1 to 4 in sequence regardless of the number of beacons 20 included in the system.

In addition, considering that transmission and reception between the receiver 10 and the beacons 20 is performed using RF waves and ultrasonic waves, the predetermined intervals between adjacent beacons 20 preferably do not exceed 5 m.

Operation of the system configured as described above for position awareness to minimize power consumption in a sensor network environment according to the present invention will be described below in detail with reference to the appended drawings.

FIG. 2 is a flowchart illustrating a method for position awareness in a sensor network environment according to an exemplary embodiment of the present invention.

Referring to FIG. 2, when the power is turned on, the receiver 10 first sends a broadcasting packet according to a beacon solicitation message using an RF signal, thereby switching beacons 20 at adjacent positions to an ultrasonic interrupt standby state. Here, the beacon solicitation message is received by only beacons located in a limited area within range of the transmitted RF signal.

Meanwhile, when the power is turned on, the beacons 20 wait in a standby state. When the beacon solicitation message is received from the receiver 10, the beacons 20 send their own position coordinates, unique IDs, and numbered IDs to the receiver 10, and return to the standby state. Here, beacons not receiving the beacon solicitation message are continually kept in the standby state.

Then, in step 110, the receiver 10 calculates its own initial position coordinates using the transmitted beacon information. In addition, for synchronization, the receiver 10 calls the beacons 20 having the unique IDs and sends a synchronization signal Sync to the beacons. Then, the beacons 20 generate and emit ultrasonic waves to the receiver 10 to report confirmation of reception, thereby finishing an initialization process, which is step 100, for synchronization.

Here, when the initial process is finished, the beacons enter the standby state.

When the initialization process for synchronization is finished and the initial position coordinates of the receiver are calculated, the receiver 10 broadcasts a start message that begins beacon scheduling for automatic position awareness.

The start message includes synchronization information of the receiver 10, information on time frames $T_{slot}^n$ according to the order of the numbered ID of each beacon 20, and activation information.

Here, the receiver synchronization information is used for synchronizing the beacons of the system with the receiver.

The time frame information $T_{slot}^n$ is as follows:

$$T_{slot}^n = T_{ultra} + T_{calc} + \epsilon$$

Here, n denotes a numbered ID which is one of 0, 1, 2 and 3, $T_{ultra}$ denotes a time taken for ultrasonic wave arrival, and $T_{calc}$=denotes a time taken for the receiver to calculate a distance value.

Since the numbered IDs are four, a round time of each of the beacons 20 is the sum of four pieces of time frame information. During one round time, all beacons having the four numbered IDs emit ultrasonic waves in order of the numbered IDs, and the receiver calculates the distance value. In other words, after one round time, a user device or context awareness server can calculate the position coordinates of the receiver.

The total round time $RT_{slot}^n$ is as follows:

$$RT_{slot}^n = \sum_{n=1}^{4} T_{slot}^n.$$

Subsequently, the activation information included in the start message designates the unique IDs of beacons required for position information calculation when the receiver recognizes a present position on an application map in the initialization process.

In step 210, when the start message is broadcast from the receiver 10 as described above, beacons 20 within the ultrasonic range of the receiver 10 enter an active mode.

In step 220, the beacons 20 in the active mode perform synchronization by compensating their own times using the synchronization information of the start message. Then, the beacons in the active mode generate ultrasonic waves in time frames assigned according to their own numbered IDs.

Conventionally, the beacons 20 are recognized using both RF and ultrasonic waves. However, in the present invention, since the beacons 20 generating ultrasonic waves are activated by the start message, they can be easily recognized without using RF waves.

In this manner, the receiver 10 uses RF waves only when the broadcasting packet according to the beacon solicitation message is used in the initialization process and the periodic synchronization message is used, without constantly generating RF waves calling a unique ID of the beacon 20, and thus can conserve wireless resources and electric power. In addition, it is possible to remarkably reduce the probability of wireless collision or delay time upon routing or exchange of required information.

And, the beacons 20 whose unique IDs do not correspond to activation enter a low-power mode with only ultrasonic reception interrupt applied, thereby minimizing power consumption. Then, when the ultrasonic waves are received from the receiver 10, the beacons 20 switch from the low-power mode to the active mode by the interrupt and participate in an automatic position awareness process, in step 200.

As described above, the beacons 20 in the low-power mode and the beacons 20 in the active mode are changed according to whether or not a beacon exists within the range of the periodically transmitted ultrasonic waves.

More specifically, the ultrasonic waves periodically emitted from the receiver 10 at a moved position switch the beacons 20 located in the corresponding area to the active mode. In addition, when not receiving the ultrasonic waves, the beacons 20 in the active mode determine that position awareness is unnecessary, switch back to the low-power mode, and stand by for a new ultrasonic reception interrupt.

In this manner, the receiver 10 continuously obtains information on distance from the beacons 20, and transmits the distance information to the user device and context awareness server, thereby updating the position coordinates of the receiver 10, in step 230.

Here, the user device (personal digital assistant (PDA) or laptop) provides the function of position coordinates calculation and the function of a GUI displaying calculated position coordinates. Therefore, when there is data from the receiver 10 while watching a serial interface, the user device reads and parses the data into three distance values. Each parsed distance value is input into position coordinates calculation algorithm, and position coordinates of the user device are calculated and displayed on a GUI.

Also, when it is checked that the calculated position coordinates of the receiver 10 exist at a previously set threshold position for setting a hand-off area in the application map while the user device is watching, the user device serially sends a message serially indicating the probability of hand-off to the receiver 10.

In addition, the context awareness server connects through the serial interface to a sink node communicating with the receiver 10 using an RF. And, the context awareness server has the same position calculation algorithm and GUI as the user device. Therefore, the information on distances from the beacons 20 transmitted from the receiver 10 using the RF is input into the position calculation algorithm of the context awareness server through the sink node, and the position coordinates of a user are calculated and displayed on the GUI.

A difference between the context awareness server and the user device is that the context awareness server recognizes the user's position and allows the system to provide a ubiquitous service without user intervention.

In this manner, the current position of the receiver 10 is recognized, in step 200.

Then, when another beacon 20 newly included in the ultrasonic range due to movement of the receiver 10 receives a synchronization request message from the receiver 10, the beacon 20 responds to the message and periodically performs synchronization with the system.

The present invention basically supports expandability for large-scale service, in which case a hand-off is required.

Since the receiver 10 knows the map of the system by an application program of the user device, a hand-off threshold position can be set considering the ultrasonic range of each beacon 20. Therefore, a hand-off occurs by determining whether or not the receiver 10 moves into the ultrasonic range of a beacon that has the same numbered ID as the beacon 20 emitting ultrasonic waves received at the receiver's current position but a different unique ID.

More specifically, when a position displayed in the application program map during continuous movement proceeds to a hand-off threshold position, the receiver 10 transmits a hand-off process message using an RF, the hand-off process message destined for the unique ID of the beacon 20 at the current position having the same numbered ID as the beacon that might receive ultrasonic waves soon.

Then, the beacon 20 receiving the hand-off process message may receive the ultrasonic waves in a time frame to transmit the ultrasonic waves, which means that the receiver 10 goes beyond the hand-off threshold position and is handed off to the next area.

On the contrary, the ultrasonic waves transmitted from the receiver 10 may not be received by the next time frame of the corresponding beacon 20 having a unique ID, which means that a hand-off does not occur because the receiver 10 returns from the hand-off threshold position.

Meanwhile, when the corresponding beacon 20 receives a broadcasting packet according to the beacon solicitation message using an RF from the receiver 10 in the corresponding time frame, it is determined that the hand-off occurs and a hand-off process routine is executed, in step 310.

As described above, the system and method for position awareness to minimize power consumption in a sensor network environment according to the present invention have the following advantages.

First, since the system and method use auto-beaconing according to a semi-automatic scheme in which beacons are triggered by a receiver, rather than beacon scheduling according to a receiver order-type round-robin scheme of a conventional system, it is possible to be continuously aware of a position even when the system is expanded.

Second, the system and method significantly reduce power consumption compared to the conventional system by minimizing RF and ultrasonic waves periodically generated in a wireless sensor network. An additional effect of minimized RF transmission is that the possibility of RF collision in the system can be minimized.

Third, since beacons not required for position awareness from the viewpoint of a current position in an application map can be made to enter a low-power mode using activation information included in a start message, it is possible to minimize RF resource and power consumption of the entire system.

Fourth, since most pulses occupying media in the system are ultrasonic waves including no information, it is not necessary to consider the problem of collision between beacons even when the system is expanded.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for position awareness, comprising the steps of:
   (a) calculating initial position coordinates using beacon information received from adjacent beacons in response to a broadcast beacon solicitation signal, sending a synchronization signal to the beacons, and synchronizing the beacons;
   (b1) periodically broadcasting a start message, which is an ultrasonic signal, and activating the adjacent beacons;
   (b2) receiving the ultrasonic waves generated in time frames assigned in order of numbered identifications (IDs) of beacons after the activated beacons are synchronized by time compensation;
   (b3) updating information on a distance between a receiver and a beacon using the received ultrasonic waves, transmitting the distance information to a user device and a context awareness server, and calculating the position coordinates; and
   (c) when the calculated position coordinates correspond to a predetermined hand-off threshold position, transmitting a hand-off process message to a newly activated beacon, and executing a hand-off process routine.

2. The method for position awareness of claim 1, wherein step (a) comprises the steps of:
   (a1) broadcasting the beacon solicitation signal, which is a radio frequency (RF) signal, and transmitting the beacon solicitation signal to the beacons fixed at adjacent positions;
   (a2) receiving the beacon information from the beacons receiving the beacon solicitation signal, and calculating the initial position coordinates of a receiver; and
   (a3) sending the synchronization signal to the beacons, synchronizing the beacons, and receiving ultrasonic waves emitted from the beacons confirming reception.

3. The method for position awareness of claim 1, wherein step (b1) further comprises the step of switching a beacon not receiving the start message to a low-power mode.

4. The method for position awareness of claim 1, wherein the position coordinates calculation of step (b3) comprises the steps of:
   when there is data from the receiver detected while monitoring, reading and parsing the data into three distance values; and inputting each parsed distance value into a position coordinates calculation algorithm, calculating the position coordinates, and displaying the position coordinates on a graphic user interface (GUI).

5. The method for position awareness of claim 1, wherein step (c) comprises the steps of:
   (c1) setting the hand-off threshold position considering an ultrasonic range of each beacon;
   (c2) when the calculated position coordinates correspond to the set hand-off threshold position, transmitting the hand-off process message to the newly activated beacon; and
   (c3) broadcasting a beacon solicitation signal to the beacon over a radio frequency (RF), and executing the hand-off process routine.

6. The method for position awareness of claim 5, wherein the hand-off threshold position of step (c1) is set taking as a reference an ultrasonic area of a beacon having the same numbered identification (ID) as the beacon transmitting received ultrasonic waves but having a different unique ID.

7. The method for position awareness of claim 5, wherein step (c) further comprises step (c4) of responding, at a beacon receiving the beacon solicitation signal, to the beacon solicitation signal and periodically performing synchronization with a system.

8. The method for position awareness of claim 1, wherein when step (a) is finished, the beacons are kept in a standby state.

9. The method for position awareness of claim 1, wherein the signals are transmitted and received using radio frequency (RF) signals or ultrasonic signals.

10. The method for position awareness of claim 1, wherein the beacon information includes position coordinates of a beacon, a unique identification (ID), or a numbered ID.

11. The method for position awareness of claim 1, wherein the start message includes synchronization information, information on time frames $T_{slot}^n$ according to the order of a numbered identification (ID) of each beacon, or activation information.

12. The method for position awareness of claim 11, wherein the activation information includes a unique ID of each beacon.

13. A system for position awareness, comprising:
   a plurality of beacons installed at fixed positions at predetermined intervals and transmitting ultrasonic signals activated and synchronized by periodically broadcasting a start message; and
   a receiver capable of position movement, updating information on a distance between the beacons through the ultrasonic signals received from the activated beacons, and generating position measurement information on a moved position.

14. The system for position awareness of claim 13, further comprising:
   a user device providing a function of position coordinates calculation using the information generated from the receiver and a function of a graphic user interface (GUI) displaying calculated position coordinates; and
   a context awareness server recognizing a user's position, connecting to the receiver through a serial interface, and providing a ubiquitous service to the outside through a terminal.

15. The system for position awareness of claim 13, wherein the beacons are implemented by sensor nodes each having information on at least two addresses such as a unique identification (ID) and a numbered ID.

16. The system for position awareness of claim 15, wherein the unique ID is changed according to a number of the beacons included in the system, and the numbered ID is assigned using a number from 1 to 4 in sequence regardless of the number of beacons included in the system.

17. The system for position awareness of claim 13, wherein the predetermined intervals between adjacent beacons are less than 5 m.

* * * * *